United States Patent
Choi et al.

(10) Patent No.: US 8,704,812 B2
(45) Date of Patent: Apr. 22, 2014

(54) LIGHT SENSING CIRCUIT HAVING A CONTROLLED LIGHT SENSING PERIOD OR A CONTROLLED CURRENT OUTPUT PERIOD ACCORDING TO AMBIENT TEMPERATURE, METHOD OF CONTROLLING THE SAME, AND TOUCH PANEL COMPRISING THE LIGHT SENSING CIRCUIT

(75) Inventors: Deok-Young Choi, Yongin (KR); Yong-Sung Park, Yongin (KR); Do-Youb Kim, Yongin (KR); Soon-Sung Ahn, Yongin (KR); In-Ho Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 784 days.

(21) Appl. No.: 12/612,241

(22) Filed: Nov. 4, 2009

(65) Prior Publication Data

US 2010/0220069 A1    Sep. 2, 2010

(30) Foreign Application Priority Data

Mar. 2, 2009    (KR) .................. 10-2009-0017762

(51) Int. Cl.
  *G06F 3/038*    (2013.01)
  *G09G 5/00*    (2006.01)

(52) U.S. Cl.
  USPC ........................................... 345/207

(58) Field of Classification Search
  USPC .................................... 345/81, 207
  See application file for complete search history.

(56) References Cited

U.S. PATENT DOCUMENTS

| 6,127,684 | A | 10/2000 | Kaifu | |
|---|---|---|---|---|
| 6,271,880 | B1 | 8/2001 | Kameshima et al. | |
| 6,448,561 | B1 | 9/2002 | Kaifu | |
| 2004/0217928 | A1* | 11/2004 | Yamazaki et al. | 345/81 |
| 2006/0038771 | A1* | 2/2006 | Hirakata et al. | 345/102 |
| 2008/0121442 | A1* | 5/2008 | Boer et al. | 178/18.09 |
| 2008/0157682 | A1* | 7/2008 | Kwon | 315/154 |
| 2009/0033850 | A1* | 2/2009 | Ishiguro et al. | 349/116 |

FOREIGN PATENT DOCUMENTS

JP    9-266552    10/1997

OTHER PUBLICATIONS

Korean Office Action dated Sep. 14, 2010, issued in corresponding Korean Patent Application No. 10-2009-0017762.

* cited by examiner

*Primary Examiner* — Long D Pham
(74) *Attorney, Agent, or Firm* — Christie, Parker & Hale, LLP (57) ABSTRACT

A light sensing circuit, a method of controlling the same, and a touch panel including the light sensing circuit. In the method of controlling the light sensing circuit, including sensing light incident on a photodiode, generating current corresponding to the brightness of the sensed light, amplifying the current using a driving transistor, and outputting the amplified current, the ambient temperature is sensed, and a time period during which the light is sensed by the photodiode or the amplified current is output is controlled by the sensed ambient temperature. Thus, the sensitivity of the light sensing circuit may be constantly maintained without being influenced by the ambient temperature.

24 Claims, 6 Drawing Sheets

FIG. 1

Related Art

Related Art

LIGHT SENSING CIRCUIT HAVING A CONTROLLED LIGHT SENSING PERIOD OR A CONTROLLED CURRENT OUTPUT PERIOD ACCORDING TO AMBIENT TEMPERATURE, METHOD OF CONTROLLING THE SAME, AND TOUCH PANEL COMPRISING THE LIGHT SENSING CIRCUIT

CROSS-REFERENCE TO RELATED APPLICATION

This application claims the benefit of Korean Application No. 10-2009-0017762, filed in the Korean Intellectual Property Office on Mar. 2, 2009, the disclosure of which is incorporated herein by reference.

BACKGROUND OF THE INVENTION

1. Field of the Invention

Aspects of the present invention relate to a light sensing circuit, a method of controlling the same, and a touch panel including the light sensing circuit, and more particularly, to a light sensing circuit having sensitivity constantly maintained without being influenced by the ambient temperature, a method of controlling the same, and a touch panel including the light sensing circuit.

2. Description of the Related Art

Light sensing circuits, which sense current generated by light incident on a photodiode, are used for image sensors, touch panels, etc. The brightness of the incident light may be determined, or a finger touch on a display panel may be detected, by sensing the generated current.

Figure 1:
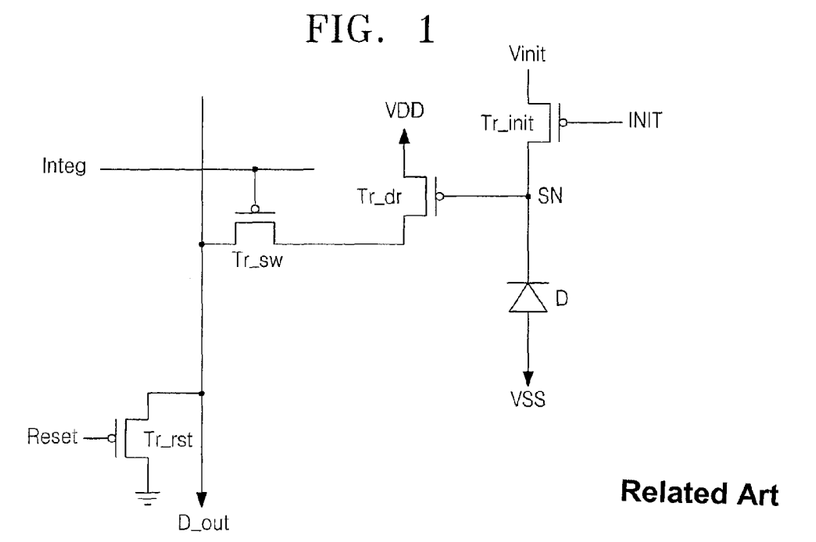
FIG. 1 is a circuit diagram of a conventional light sensing circuit.

FIG. 1 is a circuit diagram of a conventional light sensing circuit. As shown in FIG. 1, a conventional light sensing circuit includes a photodiode D, a driving transistor Tr_dr, a switching transistor Tr_sw, an initiation transistor Tr_init, and a reset transistor Tr_rst.

The photodiode D senses light incident from the outside and generates current according to the brightness of the light. The photodiode D includes an anode connected to a first power supply having a first voltage VSS and a cathode connected to a sensing node SN. The photodiode D is reverse biased, and thus, the potential of the anode should be lower than the potential of the cathode. If light is incident from the outside while the photodiode D is reverse biased, current is generated according to the brightness of the light.

The initiation transistor Tr_init periodically applies an initiation voltage Vinit to the sensing node SN. The initiation voltage Vinit is a voltage reverse biasing the photodiode D and satisfies Vinit>VSS. A first electrode of the initiation transistor Tr_init is connected to the sensing node SN, a second electrode of the initiation transistor Tr_init is connected to a second power supply which supplies the initiation voltage Vinit, and a gate electrode of the initiation transistor Tr_init is connected to an initiation line INIT through which an initiation signal is applied to the initiation transistor Tr_init.

The driving transistor Tr_dr outputs a brightness current corresponding to the brightness of light incident on the photodiode D. In this regard, the brightness current is obtained by amplifying current generated in the photodiode D. A first electrode of the driving transistor Tr_dr is connected to a third power supply which supplies a third voltage VDD to the first electrode, and a gate electrode of the driving transistor Tr_dr is connected to the sensing node SN. In addition, a second electrode of the driving transistor Tr_dr is electrically connected to a data output line D_out.

The switching transistor Tr_sw controls current generated in the driving transistor Tr_dr to flow in the data output line D_out. A first electrode of the switching transistor Tr_sw is connected to the second electrode of the driving transistor Tr_dr, and a second electrode of the switching transistor Tr_sw is connected to the data output line D_out. In addition, a gate electrode of the switching transistor Tr_sw is connected to a light integration control line Integ to which a light integration signal is applied.

The reset transistor Tr_rst controls the data output line D_out to be periodically grounded. A first electrode of the reset transistor Tr_rst is connected to the data output line D_out, and a second electrode of the reset transistor Tr_rst is grounded. In addition, a gate electrode of the reset transistor Tr_rst is connected to a reset line Reset to which a reset signal is applied. The reset transistor Tr_rst is turned on by the periodically applied reset signal so that the potential of the data output line D_out is periodically 0V.

A method of controlling the conventional light sensing circuit will be described with reference to FIG. 1. When the initiation transistor Tr_init is turned on by an initiation signal, the potential of the sensing node SN is set to an initiation voltage Vinit. Since the initiation voltage Vinit is greater than the first voltage VSS, the photodiode D is reverse biased.

When light is incident on the photodiode D, current is generated according to the brightness of the incident light. The greater the brightness of light, the higher the current generated in the photodiode D. Since charges flow into the sensing node SN by the generated current of the photodiode D, the potential of the sensing node SN decreases.

The driving transistor Tr_dr has a low level voltage between gate and drain electrodes of the driving transistor Tr_dr since the potential of the sensing node SN decreases, and thus current corresponding to voltage between the gate and source electrodes of the driving transistor Tr_dr is generated.

When the switching transistor Tr_sw is turned on by the light integration signal, current generated in the driving transistor Tr_dr flows through the data output line D_out. An output sensing unit (not shown) may be disposed at one end of the data output line D_out to detect the level of the brightness of the incident light according to the current flowing through the data output line D_out. For example, the output sensing unit may include a capacitor. In this case, charges are stored in the capacitor by the current flowing through the data output line D_out. The brightness of the incident light may be determined by measuring voltages of both ends of the capacitor.

However, the sensitivity of the operation of the conventional light sensing circuit may vary according to temperature. Since current generated in the photodiode D may vary according to temperature, the brightness of the incident light obtained using the current flowing through the data output line D_out may not be accurately obtained.

Figure 2A:
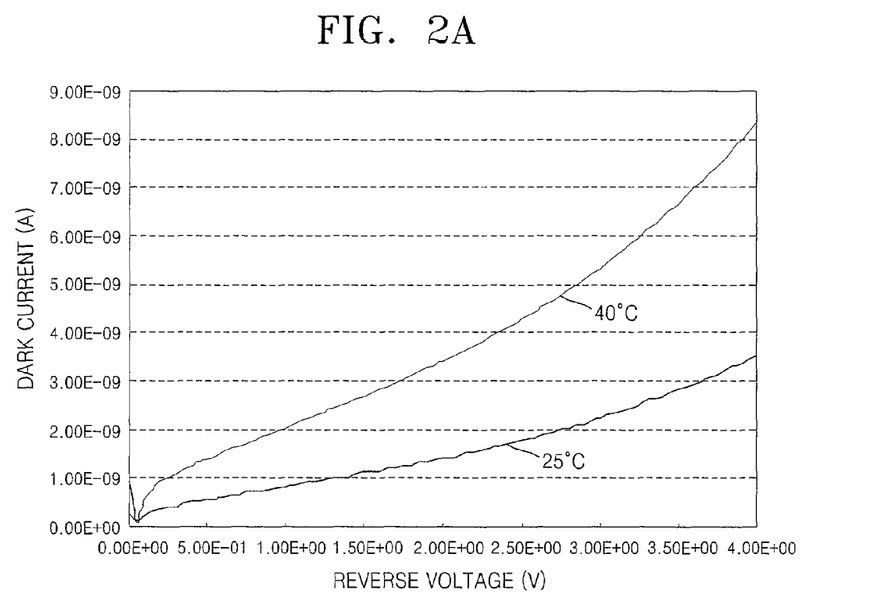
FIG. 2A is a graph illustrating current generated in the photodiode.

FIG. 2A is a graph illustrating a dark current generated in the photodiode. In FIG. 2A, a horizontal axis represents a reverse voltage applied across the photodiode D, and a vertical axis represents a dark current flowing through the photodiode D. The upper curve represents current measured at 40 degrees Celsius, and the lower curve represents current measured at 25 degrees Celsius. Referring to FIG. 2A, the higher the temperature, the more current flows at the same brightness.

The potential of the gate electrode of the driving transistor Tr_dr gradually decreases in a time period during which light is applied to the photodiode D increases. Due to the gradual decrease in the potential of the gate electrode of the driving transistor Tr_dr, current corresponding to the voltage between the gate and source electrodes flows from the source electrode to the drain electrode of the driving transistor Tr_dr. However, if the voltage between the gate and source electrodes of the driving transistor Tr_dr exceeds a certain level, the current flowing in the driving transistor Tr_dr is saturated and stops increasing. These characteristics may be confirmed by the V-I curve of a transistor. Even though light with different brightness is incident on the photodiode D, the current flowing through the data output line D_out may be identical to each other.

Even though the value of the current flowing through the data output line D_out is different, an output value may be saturated according to the brightness. For example, the output of the output sensing unit may be saturated, as will be described in more detail with reference to FIGS. 2B and 2C.

Figure 2B:
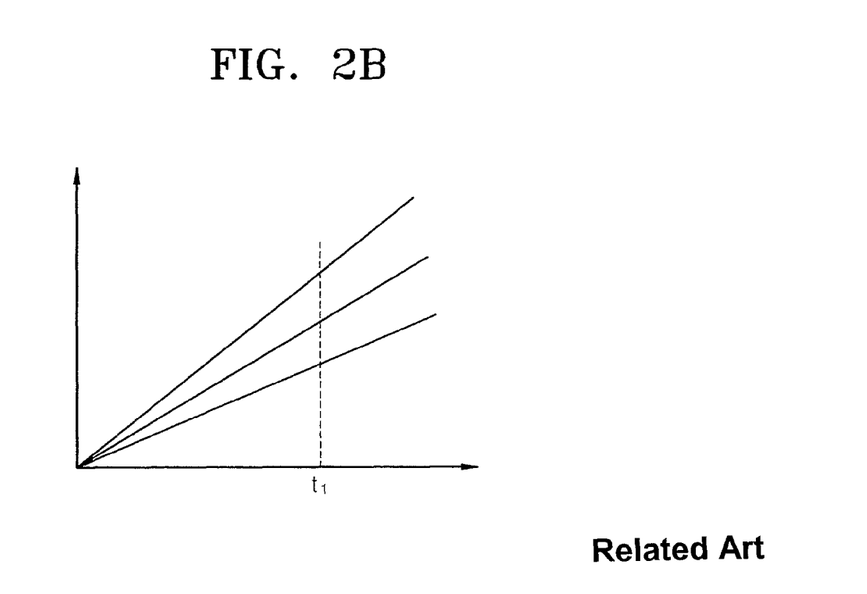
FIGS. 2B and 2C are graphs illustrating resolution of the light sensing circuit according to the light integration time period in a conventional method of controlling a light sensing circuit.
Figure 2C:
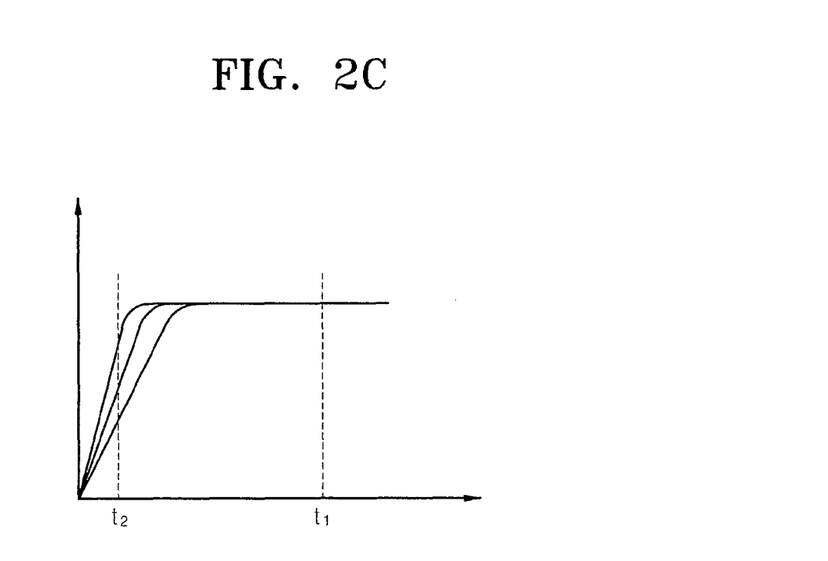

FIGS. 2B and 2C are graphs illustrating resolution of the conventional light sensing circuit according to the light integration time period in a conventional method of controlling a light sensing circuit. In FIGS. 2B and 2C, a horizontal axis represents light integration time periods, and a vertical axis represents output values measured according to current flowing through the data output line D_out. The output values may be voltages of both ends of the capacitor of the output sensing unit. In this regard, an output value is measured when the conventional light sensing circuit is at room temperature in FIG. 2B, and the output value is measured when the conventional light sensing circuit is at a temperature higher than room temperature in FIG. 2C.

Referring to FIG. 2B, if the light integration time period is t1, the output value in proportion to the brightness may be measured. The greater the brightness, the higher the output value. The less the brightness, the lower the output value. Thus, the brightness of the incident light may be accurately determined.

Referring to FIG. 2C, if the light integration time period is t2, the output value is in proportion to the brightness, and thus the brightness of the incident light may be accurately determined. However, if the light integration time period is t1, the output value is saturated, and thus the output value may be the same regardless of the brightness of the incident light. At light integration time period t1, even though different currents are generated according to the brightness, the output values are the same since the current reaches the limit of the capacitor disposed at one end of the data output line D_out.

Thus, there is a need to develop a method of driving a light sensing circuit having sensitivity constantly maintained without being influenced by the ambient temperature.

SUMMARY OF THE INVENTION

Aspects of the present invention provide a light sensing circuit having sensitivity constantly maintained without being influenced by the ambient temperature, a method of controlling the same, and a touch panel including the light sensing circuit.

According to an aspect of the present invention, a method of controlling a light sensing circuit is provided. The method includes: sensing light incident on a photodiode; generating current corresponding to a brightness of the sensed light; amplifying the current using a driving transistor; and outputting the amplified current, wherein the ambient temperature of the photodiode is sensed, and a time period during which the light is sensed by the photodiode or a time period during which the amplified current is output is controlled according to the sensed ambient temperature.

According to another aspect of the present invention, a time period during which light is sensed may be reduced as the sensed ambient temperature increases.

According to another aspect of the present invention, the time period during which light is sensed by the photodiode may be less than a time period during which the current amplified by the driving transistor reaches a saturation level.

According to another aspect of the present invention, the time period during which light is sensed by the photodiode may be less than a time period during which a voltage of a cathode of the photodiode reaches a first voltage.

According to another aspect of the present invention, a time period during which the amplified current is output may be reduced as the sensed ambient temperature increases.

According to another aspect of the present invention, light sensing circuit is provided. The light sensing circuit includes: a photodiode to sense incident light to generate current; a driving transistor to amplify the current; a switching transistor outputting the amplified current; a temperature sensing unit to sense the ambient temperature; and a controller to control a time period during which light is sensed by the photodiode or a time period during which the amplified current is output, according to the sensed ambient temperature.

According to another aspect of the present invention, the controller may reduce a time period during which light is sensed as the sensed ambient temperature increases.

According to another aspect of the present invention, the controller may reduce a time period during which the amplified current is output as the sensed ambient temperature increases.

According to another aspect of the present invention, a light sensing touch panel is provided. The light sensing touch panel includes: a plurality of pixel circuits; a plurality of light sensing circuits; and a temperature sensing unit to sense the ambient temperature; wherein the light sensing circuits each include: a photodiode connected to a first voltage source and a sensing node, to sense light incident on the photodiode to generate a first current; a driving transistor to amplify the first current to generate a second current, the driving transistor including a first electrode connected to a second source, a gate electrode connected to the sensing node, and a second electrode; a switching transistor to control the supply and blocking of the second current, the switching transistor including a first electrode connected to the first electrode of the driving transistor, a second electrode connected to a data output line, and a gate electrode to which a second scan signal is applied and to which a second scan line is connected; and a controller to control a time period during which light is sensed by the photodiode or a time period during which the amplified current is output, according to the sensed ambient temperature.

According to another aspect of the present invention, the pixel circuits each may include an organic light-emitting diode (OLED).

According to another aspect of the present invention, the light sensing touch panel may further include: a first scan driving unit to apply a first scan signal to the pixel circuits, wherein the pixel circuits receive a data signal from data lines according to the first scan signal applied to the first scan lines; a second scan driving unit to apply a second scan signal to the light sensing circuits; and an output sensing unit to receive a second current from the data output lines and to convert the second current to brightness data.

According to another aspect of the present invention, the light sensing touch panel may further include an initiation unit to initiate the sensing node.

According to another aspect of the present invention, the light sensing touch panel may further include an initiating driving unit to apply an initiation signal to the initiation unit.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
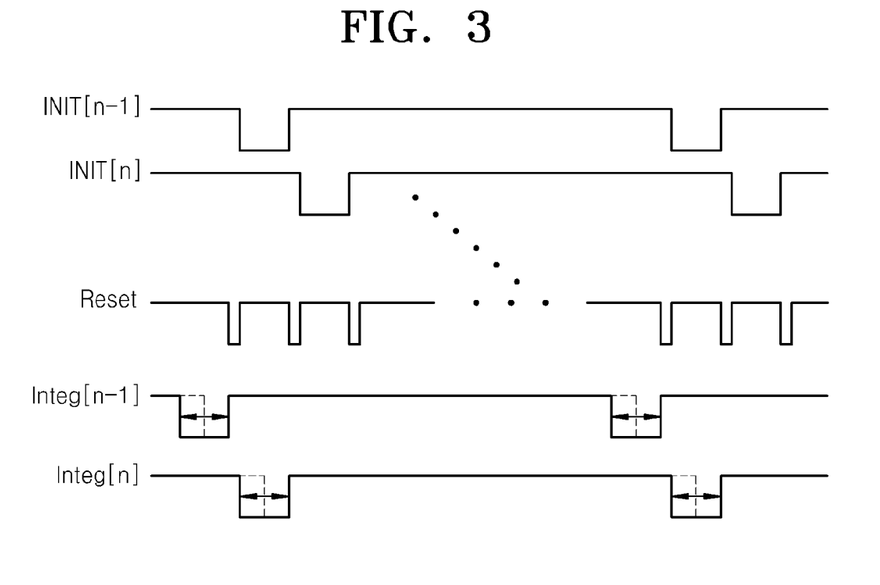
FIG. 3 is a timing diagram explaining a method of controlling a light sensing circuit, according to an embodiment of the present invention.

FIG. 3 is a timing diagram explaining a method of controlling a light sensing circuit, according to an embodiment. The timing diagram of FIG. 3 illustrates an initiation signal applied to an initiation line INIT, a reset signal applied to a reset line Reset, and a light integration signal applied to a second scan line Integ, in each of a plurality of light sensing circuits arranged in a matrix form.

In the initiation line INIT, an initiation signal is sequentially applied from a 1st initiation line INIT[1] to a nth initiation line INIT[n]. The potential of a sensing node SN of the light sensing circuit, arranged in each corresponding row, is set to the initiation voltage Vinit by the initiation signal.

A reset signal is periodically applied to the reset line Reset. Thus, an output sensing unit disposed at one end of the data output line D_out is periodically initiated so that current output from the light sensing circuit may be accurately measured.

A light integration signal is periodically applied to the second scan line Integ right before the initiation signal is applied to the initiation line INIT. As shown by a dotted line in the light integration signal of FIG. 3, the ambient temperature is sensed, and the length of a period during which the light integration signal is applied to the second scan line Integ may be controlled according to the sensed ambient temperature. The light integration signal is applied to the second scan line Integ during the entire time period between reset signals, e.g., during the light integration time period t1 of FIG. 2C, in a conventional light emitting circuit. However, the time period during which the light integration signal is applied may be controlled according to temperature, e.g., the light integration time period t2 of FIG. 2C.

In the method of controlling the light sensing circuit according to an aspect of the present invention, the method including operations of sensing light incident on a photodiode, generating current corresponding to the brightness of the sensed light, amplifying the current using a driving transistor, and outputting the amplified current, the ambient temperature is sensed, and a time period during which the amplified current is output is controlled according to the sensed ambient temperature.

The light sensing circuit may further include a temperature sensing unit which senses the ambient temperature. The light sensing circuit may also include a controller which controls a time period during which the amplified current is output according to temperature sensed by the temperature sensing unit. The controller may reduce the time period during which the amplified current is output as the temperature sensed by the temperature sensing unit increases. For example, as shown in FIG. 2C, a time period during which the current is output may be changed from the light integration time period t1 to the light integration time period t2.

The sensitivity of the light sensing circuit may not be influenced by the ambient temperature, but may be constantly maintained by controlling the time period during which the amplified current is output according to the ambient temperature.

Figure 4:
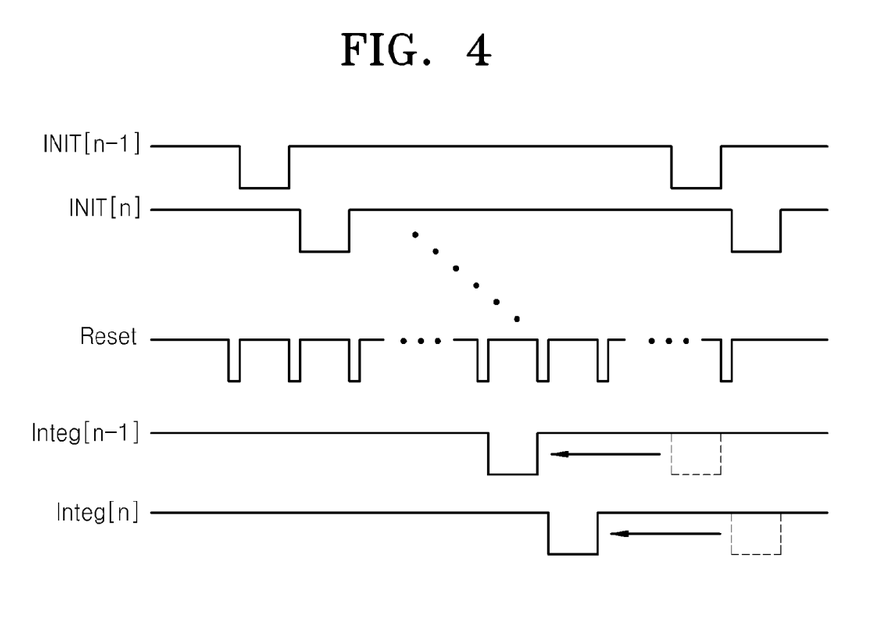
FIG. 4 is a timing diagram explaining a method of controlling a light sensing circuit, according to another embodiment of the present invention.

FIG. 4 is a timing diagram explaining a method of controlling a light sensing circuit, according to another embodiment of the present invention. Referring to FIG. 4, the timing diagram illustrates an initiation signal applied to an initiation line INIT, a reset signal applied to a reset line Reset, and a light integration signal applied to a second scan line Integ, in each of a plurality of light sensing circuits arranged in a matrix form as shown in FIG. 3.

The timing diagram of the initiation signal and the reset signal shown in FIG. 4 is the same as that of FIG. 3, except that the timing at which the light integration signal is applied to each of a plurality of second scan lines Integ in FIG. 4 is different than in FIG. 3. According to FIG. 3, the initiation signal is applied right after the light integration signal is applied to the light sensing circuits arranged in the same row of the matrix, and the length of a period during which the light integration signal is applied is controlled.

However, according to FIG. 4, while the length of the period during which the light integration signal is applied is the same as the length of the period during which the light integration signal is applied in the conventional method, the timing at which the light integration signal is applied to each of the second scan lines Integ is modified. The ambient temperature is sensed, and then the time period during which light is sensed is controlled. For this purpose, the light sensing circuit may further include a temperature sensing unit and a controller.

The controller may control the time period during which light is sensed to be less than the time period during which the current amplified in a driving transistor reaches a saturation level. Alternatively, the controller may control the time period during which light is sensed to be less than the time period during which the voltage of a cathode of a photodiode reaches the first voltage. The first voltage is a value that cause a current generated by the driving transistor to reach a saturation level.

The sensitivity of the light sensing circuit may be maintained constantly by applying the light integration signal before the amplified current reaches the saturation level by controlling the time period during which light is sensed, and outputting the amplified current.

Figure 5:
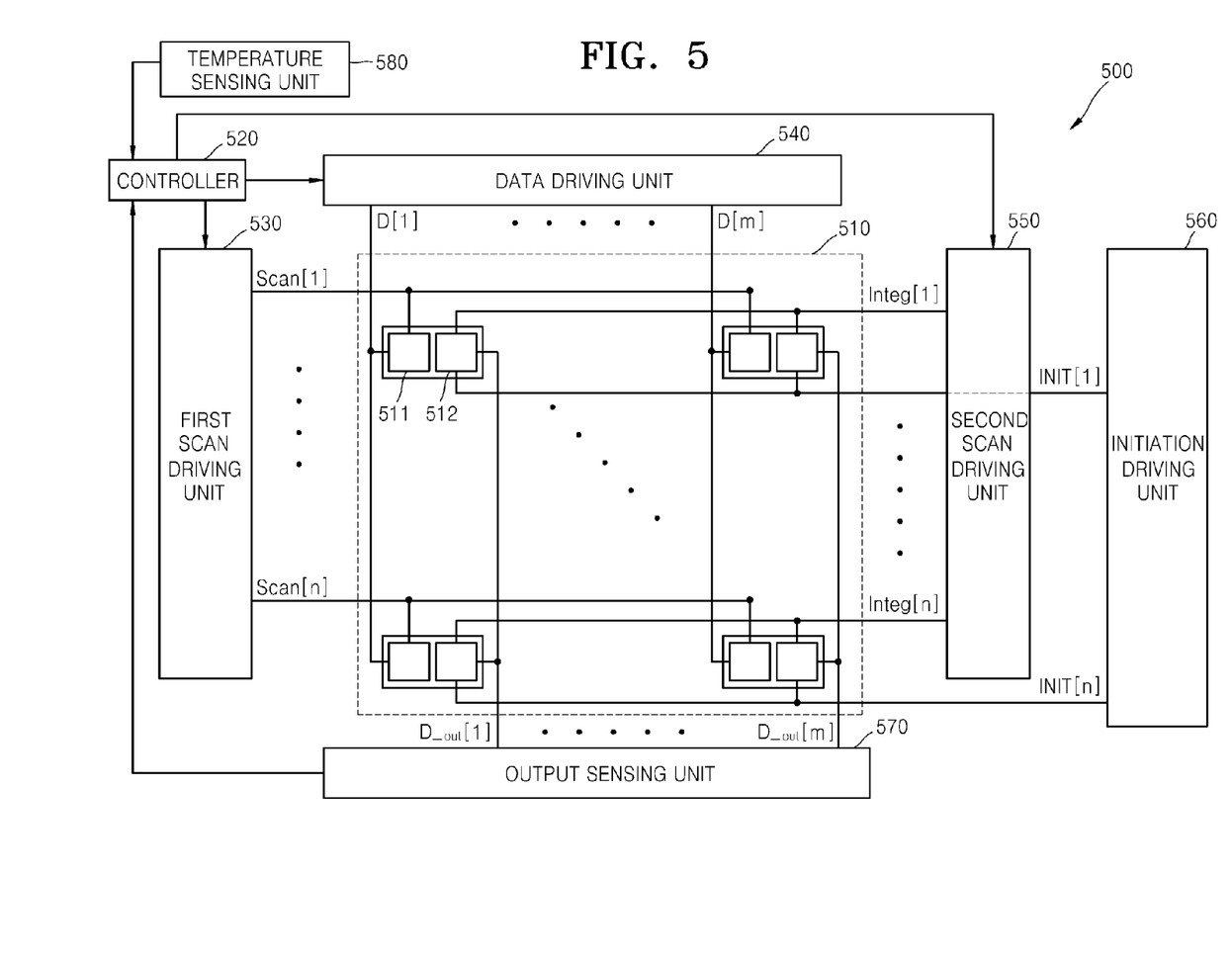
FIG. 5 is a block diagram of a touch panel employing a method of controlling a light sensing circuit, according to an embodiment of the present invention.

FIG. 5 is a block diagram of a touch panel 500 employing a method of controlling a light sensing circuit, according to an embodiment of the present invention. The touch panel 500 may include a display unit 510, a controller 520, a first scan driving unit 530, a data driving unit 540, a second scan driving unit 550, an initiation driving unit 560, an output sensing unit 570, and a temperature sensing unit 580. According to other aspects of the present invention, the touch panel 500 may include additional units. Similarly, the functionality of two or more of the above units may be integrated into a single component.

The display unit 510 of the touch panel 500 may further include a plurality of pixels arranged in an n×m matrix. The touch panel 500 may further include n first scan lines Scan[1] through S[n] and n second scan lines Integ[1] through Integ[n] which are arranged in rows, and m data lines D[1] through D[m] and m data output lines D_out[1] through D_out[m] which are arranged in columns.

Each of the plurality of pixels may include a display circuit 511 and a light sensing circuit 512. The display circuit 511 may be a display circuit of an organic light-emitting diode (OLED) display. The display circuit 511 may be a pixel circuit including two transistors, a capacitor, and an OLED. The display circuit 511 may display data in the same manner as that of a display circuit of a conventional OLED display and thus a detailed explanation of the operation of the display circuit 511 will not be given. Aspects of the present invention are not limited to the display circuit 511; any type of display circuits may be used. The light sensing circuit 512 may be a conventional light sensing circuit, such as the light sensing unit shown in FIG. 1.

The controller 520 controls the operation of each of the first scan driving unit 530, the data driving unit 540, the second scan driving unit 550, the initiation driving unit 560, and the output sensing unit 570. The controller 520 may receive brightness data from the output sensing unit 570 and determine the location of a touch. For example, the controller 520 may determine a spot where the brightness is particularly lower or higher from among all of the brightness data as the location of the touch. Since the controller 520 determines the location of the touch, the touch panel 500 may be used as an input device.

The first scan driving unit 530 applies a scan signal to the first scan lines Scan[1] through Scan[n]. The scan signal is sequentially applied to the first scan line Scan[1] through Scan[n], and a data signal is applied to the display circuit 511 in synchronization with the scan signal.

The data driving unit 540 applies a data signal to the data lines D[1] through D[m]. The data signal may be output from a voltage source or a current source in the data driving unit 540. The display circuit 511 may display data corresponding to the data signal.

The second scan driving unit 550 applies a light integration signal to the second scan lines Integ[1] through Integ[n]. The light integration signal is sequentially applied to the second scan lines Integ[1] through Integ[n]. The switching transistor Tr_sw of the light sensing circuit 512 is turned on in synchronization with the light integration signal. When the switching transistor Tr_sw is turned on by the light integration signal, current amplified by the driving transistor Tr_dr is provided to the output sensing unit 570.

The initiation driving unit 560 applies an initiation signal to initiation lines INIT[1] through INIT[n]. The initiation signal is sequentially applied to the initiation lines INIT[1] through INIT[n]. The sensing node SN of the light sensing circuit 512 periodically has the initiation voltage Vinit due to the initiation signal.

The output sensing unit 570 receives the current amplified in the light sensing circuit 512 through the data output lines D_out[1] through D_out[m]. The current is output from the light sensing circuit 512 selected by the light integration signal. The current is converted into brightness data corresponding to the current by the output sensing unit 570. For example, current may be supplied to a capacitor to detect voltages of both ends of the capacitor, and then the detected voltages may be converted into brightness data. Alternatively, the supplied current may be detected and converted into brightness data. Aspects of the present invention are not limited to the method of obtaining brightness data described above, and thus, other methods well-known to one of ordinary skill in the art may be used. The brightness data may be provided to the controller 520, and the controller 520 may determine whether there is a finger touch.

A temperature sensing unit 580 senses the ambient temperature of the touch panel 500 or the light sensing circuit 512. The temperature sensing unit 580 may include a temperature sensor. The temperature sensing unit 580 provides ambient temperature data to the controller 520.

The controller 520 receives the ambient temperature data from the temperature sensing unit 580 to control the second scan driving unit 550 such that the time period during which light is sensed or the time period during which the amplified current is output is reduced as the sensed temperature increases. The time period during which light is sensed and the time period during which the amplified current is output have been described with reference to FIG. 3, and thus a detailed explanation thereof will not be given.

The sensitivity of the light sensing circuit 512 may not be influenced by the ambient temperature; rather, the sensitivity may be constantly maintained by sensing the ambient temperature and controlling the time period during which light is sensed or the amplified current is output according to the sensed ambient temperature.

Accordingly, since the display circuit 511 and the light sensing circuit 512 may be simultaneously formed using the same process, the touch panel 500 may be simply manufactured. Since an additional panel is not necessary, the thickness of the touch panel 500 may be reduced as compared to a touch panel using different methods of recognizing touch.

Figure 6:
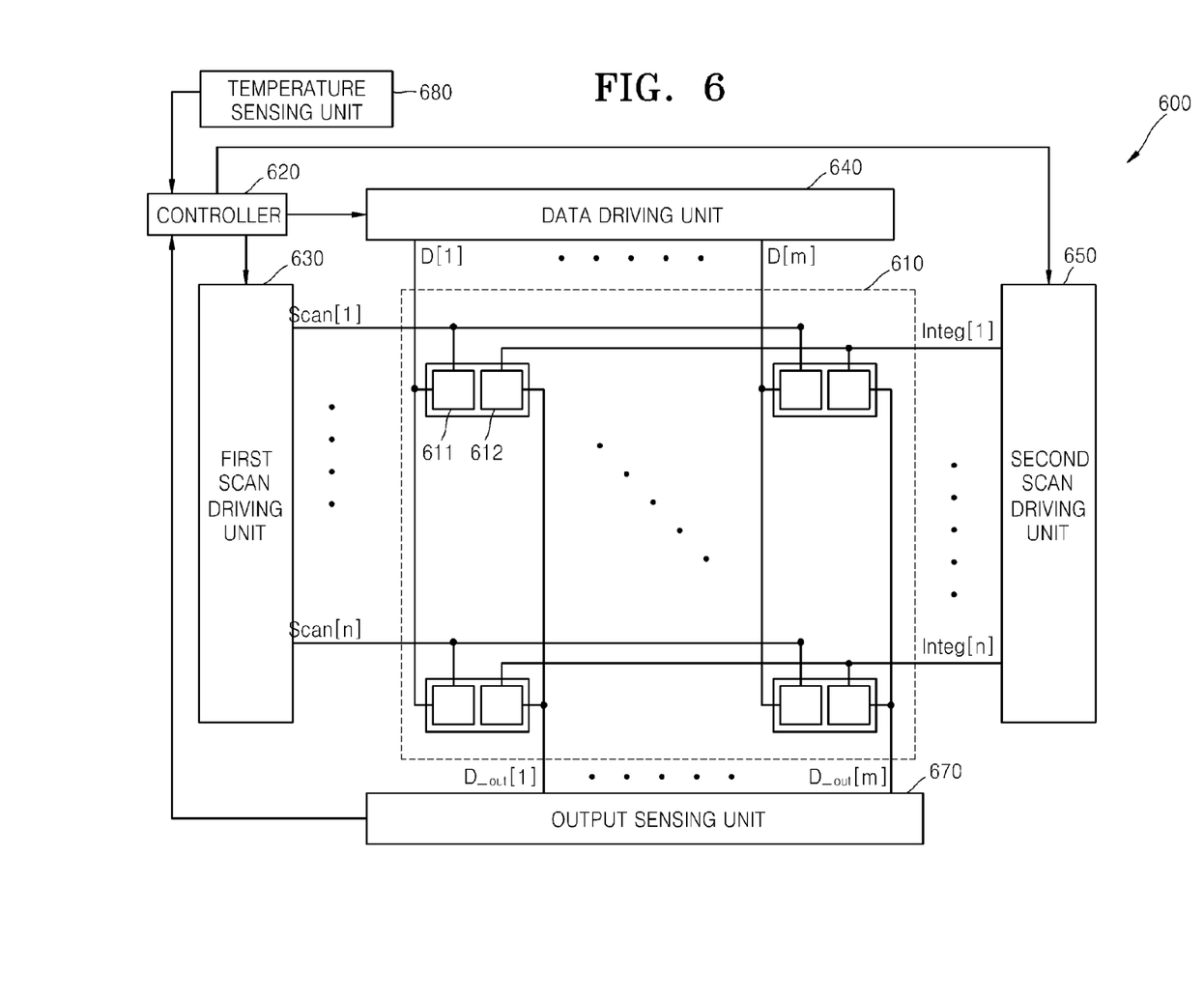
FIG. 6 is a block diagram of a touch panel employing a method of controlling a light sensing circuit, according to another embodiment of the present invention.

FIG. 6 is a block diagram of a touch panel employing a method of controlling a light sensing circuit according to another embodiment of the present invention. Referring to FIG. 6, the touch panel 600 is the same as the touch panel 500 of FIG. 5, except that the touch panel 600 does not include the initiation driving unit 560.

In this regard, a first scan signal may be shared with display pixel 611 instead of the initiation signal in order to initiate a sensing node SN of a light sensing circuit 612. For this purpose, a gate electrode of an initiation transistor Tr_init of the light sensing circuit 612 may be connected to first scan lines Scan[1] through Scan[n] which apply a first scan signal to a display circuit 611. Since the first scan lines Scan[1] through Scan[n] are used as the initiation lines, the number of wires and driving units necessary to drive the touch panel 600 may be reduced as compared to those of the touch panel 500 in FIG. 5.

Figure 7:
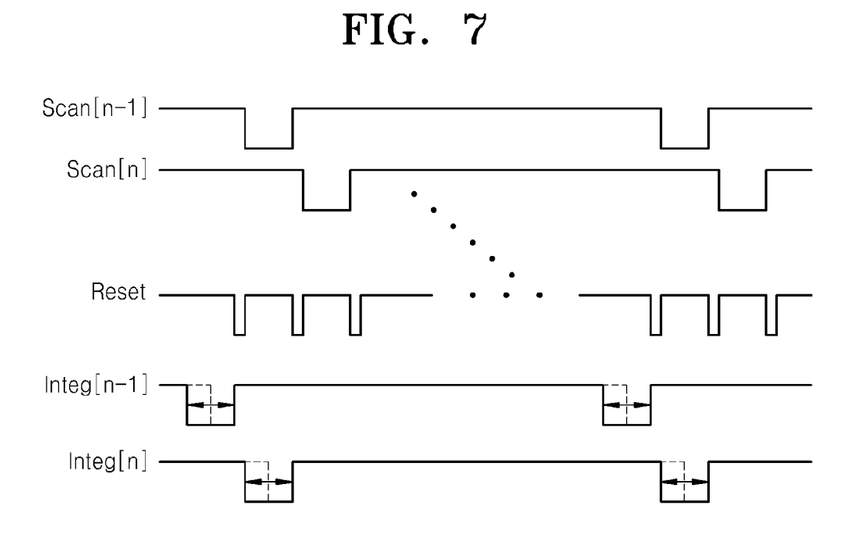
FIG. 7 is a timing diagram for explaining a method of controlling a light sensing circuit in the touch panel of FIG. 6.

FIG. 7 is a timing diagram explaining a method of controlling the light sensing circuit 612 in the touch panel 600 of FIG. 6. In comparing the timing diagram of FIG. 7 with that of FIG. 3, a first scan signal, instead of the initiation signal applied to the initiation line INT, is applied to a first scan line Scan in FIG. 7.

The first scan signal generated in the first scan driving unit 630 is sequentially applied to the first scan lines Scan[1] through Scan[n]. The voltage of the sensing node Sn of the light sensing circuit 612 arranged in each corresponding row, becomes the initiation voltage due to the first scan signal Scan.

Since the first scan lines Scan[1] through Scan[n] are used as the initiation line, the number of wires and driving units necessary to drive the touch panel 600 may be reduced as compared to those of the touch panel 500 in FIG. 5. The sensitivity of the light sensing circuit 612, like in the touch panel 500 shown in FIG. 5, may not be influenced by the ambient temperature; rather, the sensitivity may be constantly maintained by sensing the ambient temperature and controlling the time period during which light is sensed or the amplified current is output according to the sensed ambient temperature.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of controlling a light sensing circuit, the method comprising:
   sensing light incident on a photodiode;
   generating current corresponding to a brightness of the sensed light;
   amplifying the current using a driving transistor;
   outputting the amplified current using a switching transistor;
   sensing an ambient temperature; and
   controlling a time period during which light is sensed by the photodiode by controlling the timing at which the switching transistor turns on without changing a length of time during which the switching transistor turns on, or controlling a time period during which the amplified current is output by controlling the length of time during which the switching transistor turns on, according to the sensed ambient temperature,
   wherein the switching transistor is turned on either earlier or later to control the length of time during which the switching transistor turns on according to the sensed ambient temperature.

2. The method of claim 1, further comprising reducing the time period during which light is sensed as the sensed ambient temperature increases.

3. The method of claim 2, wherein the time period during which light is sensed by the photodiode is less than a time period during which the current amplified by the driving transistor reaches a saturation level.

4. The method of claim 2, wherein the time period during which light is sensed by the photodiode is less than a time period during which a voltage of a cathode of the photodiode reaches a first voltage.

5. The method of claim 1, wherein the time period during which the amplified current is output is reduced as the sensed ambient temperature increases.

6. The method of claim 1, wherein the ambient temperature is sensed to more accurately determine brightness of the light incident on the photodiode.

7. A light sensing circuit comprising:
   a photodiode to sense incident light to generate current;
   a driving transistor to amplify the current;
   a switching transistor to output the amplified current;
   a temperature sensing unit to sense an ambient temperature; and
   a controller to control a time period during which light is sensed by the photodiode by controlling the timing at which the switching transistor turns on without changing a length of time during which the switching transistor turns on, or to control a time period during which the amplified current is output by controlling a length of time during which the switching transistor turns on, according to the sensed ambient temperature,
   wherein the switching transistor is turned on either earlier or later to control the length of time during which the switching transistor turns on according to the sensed ambient temperature.

8. The light sensing circuit of claim 7, wherein the controller reduces the time period during which light is sensed as the sensed ambient temperature increases.

9. The light sensing circuit of claim 8, wherein the time period during which light is sensed by the photodiode is less than a time period during which the current amplified by the driving transistor reaches a saturation level.

10. The light sensing circuit of claim 8, wherein the time period during which light is sensed by the photodiode is less than a time period during which a voltage of a cathode of the photodiode reaches a first voltage.

11. The light sensing circuit of claim 7, wherein the controller reduces the time period during which the amplified current is output as the sensed ambient temperature increases.

12. A light sensing touch panel comprising:
   a plurality of pixel circuits;
   a plurality of light sensing circuits; and
   a temperature sensing unit to sense an ambient temperature;
   wherein the light sensing circuits each comprise:
      a photodiode connected to a first voltage source and a sensing node, to sense light incident on the photodiode to generate a first current;
      a driving transistor to amplify the first current to generate a second current, the driving transistor comprising a first electrode connected to a second source, a gate electrode connected to the sensing node, and a second electrode;
      a switching transistor to control supply and blocking of the second current, the switching transistor comprising a first electrode connected to the first electrode of the driving transistor, a second electrode connected to a data output line, and a gate electrode to which a second scan signal is applied and to which a second scan line is connected; and
      a controller to control a time period during which light is sensed by the photodiode by controlling the timing at which the second scan signal is applied to the switching transistor without changing a length of time during which the second scan signal is applied to the switching transistor, or to control a time period during which the amplified current is output by controlling the length of time during which the second scan signal is applied to the switching transistor, according to the sensed ambient temperature, and wherein the switching transistor is turned on either earlier or later to control the length of time during which the switching transistor turns on according to the sensed ambient temperature.

13. The light sensing touch panel of claim 12, wherein the controller reduces the time period during which light is sensed as the sensed ambient temperature increases.

14. The light sensing touch panel of claim 13, wherein the time period during which light is sensed by the photodiode is less than a time period during which the current amplified by the driving transistor reaches a saturation level.

15. The light sensing touch panel of claim 13, wherein the time period during which light is sensed by the photodiode is less than a time period during which a voltage of a cathode of the photodiode reaches a first voltage.

16. The light sensing touch panel of claim 13, wherein the controller reduces the time period during which the amplified current is output as the sensed ambient temperature increases.

17. The light sensing touch panel of claim 13, wherein the pixel circuits each comprise an organic light-emitting diode (OLED).

18. The light sensing touch panel of claim 13, further comprising:
   a first scan driving unit to apply a first scan signal to the pixel circuits, wherein the pixel circuits receive a data signal from data lines according to the first scan signal applied to first scan lines;
   a second scan driving unit to apply the second scan signal to the light sensing circuits; and
   an output sensing unit to receive the second current from the data output lines and to convert the second current to brightness data.

19. The light sensing touch panel of claim 18, further comprising an initiation unit to initiate the sensing node.

20. The light sensing touch panel of claim 19, further comprising an initiating driving unit to apply an initiation signal to the initiation unit.

21. The light sensing touch panel of claim 19, wherein the first scan driving unit applies the first scan signal to the initiation unit to initiate the sensing node.

22. A method of controlling a light sensitive circuit, the method comprising:
   sensing light incident on a photodiode over a first period of time;
   sensing an ambient temperature;
   amplifying a current generated based on a brightness of the sensed light;
   outputting the amplified current for a second period of time; and
   adjusting the first period of time or the second period of time by controlling a duty cycle or a duty rate of one or more switches of the light sensitive circuit based on the sensed ambient temperature,
   wherein the one or more switchs are turned on either earlier or later to control the duty cycle according to the sensed ambient temperature.

23. The method of claim 22, wherein the adjusting of the first period of time comprises reducing the first period of time as the sensed ambient temperature increases.

24. The method of claim 22, wherein the adjusting of the second period of time comprises reducing the second period of time as the sensed ambient temperature increases.

* * * * *